Aug. 15, 1967 P. S. BALDWIN 3,336,033
SEALING RING FOR PISTONS SLIDABLY MOUNTED IN CYLINDERS OF HYDRAULIC MECHANISMS
Filed Nov. 8, 1963
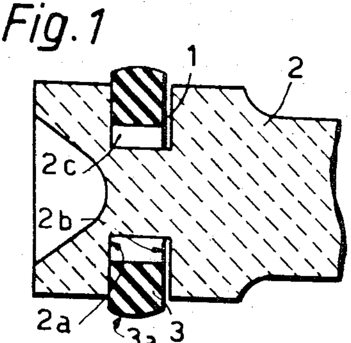
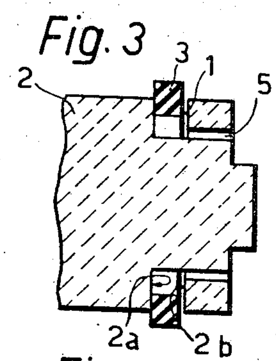
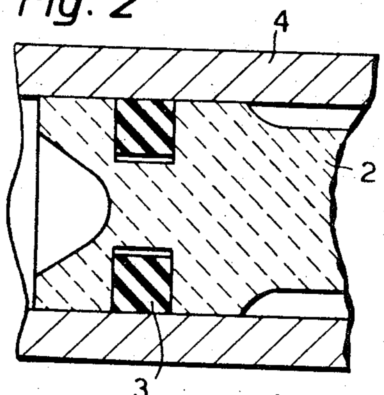
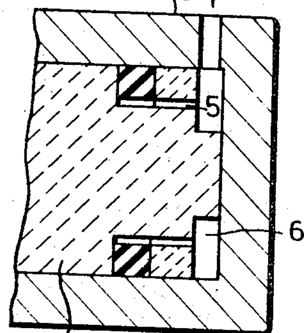
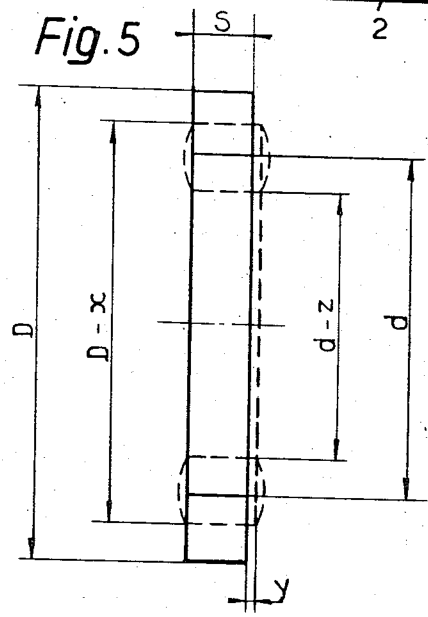

United States Patent Office 3,336,033

Patented Aug. 15, 1967

3,336,033

SEALING RING FOR PISTONS SLIDABLY MOUNTED IN CYLINDERS OF HYDRAULIC MECHANISMS

Philip Sidney Baldwin, Florence, Italy, assignor to Receipt-AG, Lucerne, Switzerland, a corporation of Switzerland Filed Nov. 8, 1963, Ser. No. 322,471
Claims priority, application Italy, Nov. 13, 1962, 22,614/62
1 Claim. (Cl. 277—78)

This invention relates to a sealing ring for pistons movable within cylinders of hydraulic mechanisms, of the type in which an annular seal made of resilient material is accommodated by an annular groove in the piston periphery, the bore of said seal being larger in the assembled piston condition than the diameter of the groove bottom.

An object of this invention is to provide a seal of the type referred to above, adapted to prevent flow of liquid in an axial direction of the cylinder at the seal region either under static conditions or during movement of the piston within the cylinder.

A further object of this invention is to provide a seal of the type referred to above which is additionally adapted to act as a valve controlling liquid flow between chambers into which the inside of the cylinders can be subdivided by the piston.

With these objects in view sealing is effected according to this invention by subjecting the annular seal made of resilient material within the cylinder constantly to a radially acting preliminary compression directed towards the seal axis, which is set up on introduction of the piston carrying the seal into the cylinder.

According to a further aspect of this invention the seal can be simultaneously subjected to an axial compression between the annular abutments confining the said groove by effect of the deformation undergone by the seal under the preliminary radial compression thereon.

Further characteristic features and advantages of this invention will be clearly understood from the appended description referring by way of example to embodiments shown on the accompanying drawings, wherein:

FIGURE 1 is an axial sectional view of a piston portion carrying an annular seal made of resilient material, before the piston and seal are introduced into the cylinder, FIGURE 2 is an axial sectional view showing the piston and seal slidably mounted within a cylinder associated with a hydraulic mechanism, FIGURE 3 is an axial sectional view of a piston portion carrying the annular seal before introduction thereof into their respective cylinder, according to a modified embodiment, FIGURE 4 is an axial sectional view showing the piston and seal according to FIGURE 3 slidably mounted within a cylinder, FIGURE 5 is a diagrammatical elevational view showing the deformations undergone by a resilient annular seal of square-shaped cross section under the radial compression directed towards the seal axis.

In the drawings, FIGURES 1 and 2 show the embodiment of the invention which is more particularly suitable for preventing liquid leakage from the cylinder at the regions at which said liquid is not subject to the action of any appreciable pressure.

Sealing is effected by inserting into the circumferential groove 1 in the piston body 2 an annular seal 3 made of resilient material, such as rubber. The seal is preferably of rectangular cross-sectional shape of an arcuate profile 3a at its periphery and is of an axial thickness substantially smaller than the width of the groove 1 or the spacing of the abutments 2a, 2b axially confining said groove.

The largest outer diameter of the seal is conveniently selected larger than the bore of the cylinder 4, FIGURE 2, in which the piston 2 provided with the seal 3 is mounted for movement. The bore of the seal 3 is in turn large enough to leave both before assembly of the piston 2 in the cylinder 4 and after assembly an annular clearance between the inner periphery of the seal 3 and bottom 2a of the groove 1.

In the embodiment just described the initial dimensions of the seal 3 are moreover selected such as to subject the seal on assembly into the cylinder 4 to an axial compression between the abutments 2a, 2b of the groove 1 in addition to a compression in a radial direction towards the seal axis.

In order to prevent liquid flow through the region at which sealing should be effected, where an appreciable differential pressure prevails on both sides of said region, the embodiment shown in FIGURES 3 and 4 shall conveniently be adopted. This embodiment is suitable to effect sealing at the piston head, such as in a wheel brake cylinder or a hydraulic ram and differs from the embodiment shown in FIGURES 1 and 2 merely in that axial through bores 5 are provided in the piston head, connecting the clearance between the inner periphery of the seal 3 and bottom of its respective groove with a chamber 6 in which the pressure liquid acts. A further difference is that the cross section of the annular seal 3 is of truly rectangular shape both before and after introduction of the seal into the cylinder 4.

The deformations that may be undergone by the axial dimension and bore of the annular seal, which should be known in order to properly proportion the groove receiving the seal, can be calculated by means of the following expressions:

$$Y=\frac{XDS}{1.5d^2+0.5D^2}$$

$$Z=\frac{2XDd}{1.5d^2+0.5D^2}$$

wherein Y is the increase in axial thicknes of the annular seal measured at the inner or other periphery of the seal, Z denoting the decrease in its bore.

The meaning of the further symbols will be clearly understood form FIGURE 5, wherein full lines denote the diametrical section of the undeformed seal, the dash lines denoting the diametrical section of said seal after its introduction into a cylinder, the diameter of which is smaller by X mm. than the initial outer diameter of the seal in an undeformed condition.

The above calculation relates to a case in which the annular seal is inserted into a groove wide enough to prevent a simultaneous axial compression of the seal.

It should be noted that the above given equations have been obtained taking care of the stresses arising on driving the annular rubber seal into an undeformable cylinder, and have been calculated along the formulae used in connection with driving of resilient members with slight interferences, considering a nil variation in volume of the rubber, that is assuming Poisson's modulus to equal 0.5.

What I claim is:

An annular pre-stressed resilient seal for a groove of rectangular cross-section in a piston which piston is slidable in a cylindrical bore of a hydraulic brake wheel cylinder comprising: a resilient ring of rectangular cross-section having an outer diameter in unstressed condition substantially larger than the diameter of the cylindrical bore so that the ring is radially compressed when the piston with the ring in the groove is inserted in the cylindrical bore, the axial thickness of the resilient ring being less than the width of the groove so that upon radial compression of the ring consequent axial expansion will cause the ring to bear against the groove side walls, the groove having a depth greater than the radial thickness of the ring so that an annular chamber is left between the bottom of the groove and the inner diameter of the ring when the ring is pre-stressed by placing the piston carrying the ring in the cylindrical bore, and a passage in the piston between a compression chamber in the cylinder and the annular chamber.

References Cited

UNITED STATES PATENTS

| | | | |
|---|---|---|---|
| 1,618,511 | 2/1927 | Burstall | 92—184 X |
| 1,622,043 | 3/1927 | Miller | 92—185 X |
| 1,921,996 | 8/1933 | Van Hooydonk | 92—184 X |
| 2,462,596 | 2/1949 | Bent | 277—78 |

FOREIGN PATENTS

| | | |
|---|---|---|
| 250,491 | 4/1926 | Great Britain. |

SAMUEL ROTHBERG, *Primary Examiner.*